C. H. DRIVER.
SAW BLADE.
APPLICATION FILED APR. 21, 1919.

1,336,209.

Patented Apr. 6, 1920.

Inventor
Charles H. Driver
By Morsell & Keeney
Attorneys.

UNITED STATES PATENT OFFICE.

CHARLES H. DRIVER, OF RACINE, WISCONSIN.

SAW-BLADE.

1,336,209.  Specification of Letters Patent.  Patented Apr. 6, 1920.

Application filed April 21, 1919. Serial No. 291,500.

*To all whom it may concern:*

Be it known that I, CHARLES H. DRIVER, a citizen of the United States, and resident of Racine, in the county of Racine and State of Wisconsin, have invented new and useful Improvements in Saw-Blades, of which the following is a description, reference being had to the accompanying drawings, which are a part of this specification.

My invention relates to certain new and useful improvements in saw blades, and refers more particularly to that type of blade particularly adapted for use in cutting metals in various forms.

In the type of saw blade now in common use, the teeth become clogged with material after a short travel of the blade, and further cutting is prevented until the teeth clear the work being cut and discharge the material clogging the teeth. Hence my invention has for its primary object to provide means whereby material cut by the teeth will be removed therefrom, and then discharged when the teeth clear the work being cut, whereby the teeth cut material in their entire passage over the same.

A further object of this invention is to provide means for taking care of material cut by the teeth, which consists of a material pocket having a passageway communicating with the cutting edges of the teeth, the passageway being of greater width than the depth of the teeth to permit the ready passage of material into the pocket.

A still further object of this invention is to provide means in the material pockets whereby the material retained therein will be readily discharged therefrom when they clear the work being cut.

A further object of this invention is to provide a saw blade in which the cut thereof is governed by and equal to the depth of the cutting edges of the teeth.

With the above and other objects in view which will appear as the description proceeds, my invention resides in the novel arrangement, construction and combination of parts substantially as hereinafter described, and more particularly defined by the appended claims, it being understood that such changes in the precise embodiment of the herein disclosed invention may be made as come within the scope of the claims.

In the accompanying drawing I have illustrated several forms of my invention constructed according to the best modes I have so far devised for the practical application of the principles thereof, in which.

Figure 1:
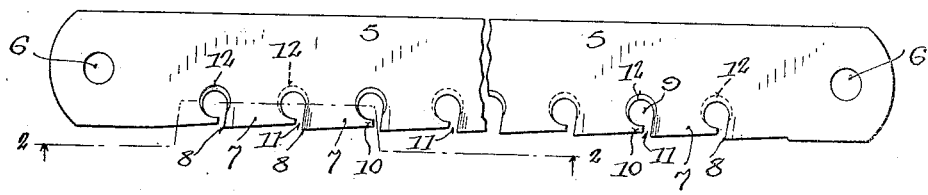
Figure 1 is a side view in elevation of the ends of a hack saw blade embodying one form of my invention.
Figure 2:
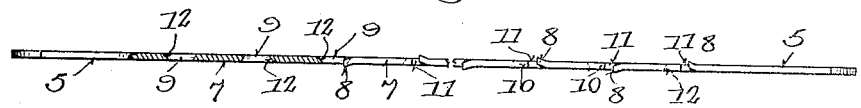
Fig. 2 is a view part in section and part in plan, said view being taken on the line 2—2 of Fig. 1.

Referring now more particularly to the accompanying drawing and to Figs. 1 and 2 thereof, 5 designates a blade proper provided near each end thereof with an aperture 6 for receiving any suitable tool frame (not shown). The blade 5 has formed on one edge thereof a plurality of tooth members 7 each provided with a cutting edge 8, inclined inwardly and away therefrom toward the base of the adjacent tooth member, as best shown in Fig. 1.

Adjacent the cutting edge of each tooth member is a material receiving pocket 9 having a projection or overhang 10 defining a restricted opening or passageway 11 connecting the pocket with the cutting edge of its adjacent tooth, and the said passageway is of a width greater than the depth of the cutting edge with respect to the inclined portion of the adjacent tooth at its base. The passageway 11 is so constructed in proportion with the cutting edge of its adjacent tooth in order that the material cut by the tooth may readily pass therethrough into the pocket 9. The pocket 9 is further provided with a beveled edge 12 on its inner closed end whereby the material retained therein may readily discharge therefrom when the blade passes outwardly of the work being cut. As best shown in Fig. 2, the cutting edges 8 are struck laterally, as is common practice in the form of plates now in general use.

Figure 3:
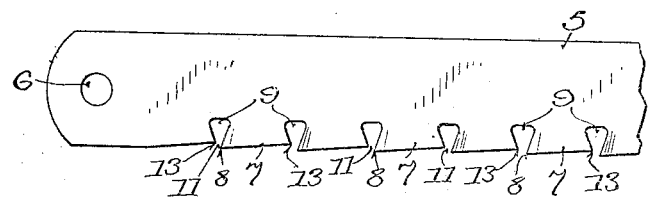
Fig. 3 is a side view in elevation of one end of a saw blade illustrating a modified construction.
Figure 4:
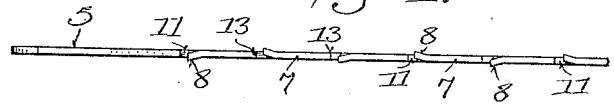
Fig. 4 is a plan view of the type of blade depicted in Fig. 3.

Referring now more particularly to Figs. 3 and 4, the pockets 9 are substantially triangular shaped, the inclined wall 13 thereof defining with the cutting edge 8 the passageway 11. As the general construction of the blade illustrated in Figs. 3 and 4 is substantially the same as that illustrated in Figs. 1 and 2 hereinbefore described, further description is thought unnecessary.

In the type of blades just described, the passageway 11 is restricted to adapt the blade for use in cutting thin material such as tubing and the like, in that the overhang of projections 10 or 13 prevents the saw from dropping over the material and thus becoming locked thereto, as will be readily understood.

Figure 5:
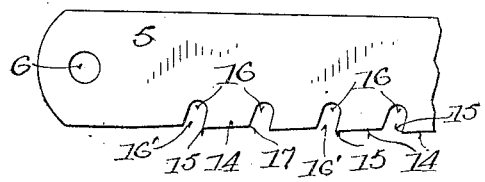
Fig. 5 is a view similar to Fig. 3 of another modified form of my invention.

In Fig. 5 I have illustrated a blade embodying my invention and especially adapted for use with large material and for use in making heavy cuts, and consists of the tooth member 14 provided with a cutting edge 15 communicating with a material pocket 16, and in this form of blade the passageway 17 is not restricted by the rear lower end 17 of the adjacent tooth member, as in modifications hereinbefore described.

From the foregoing description taken in connection with the accompanying drawing it will be obvious to those skilled in the art to which an invention of this character appertains that I provide a saw blade which will be durable in construction, and efficient in operation in that the cutting edges cut throughout their entire movement as hereinbefore described.

What I claim as my invention is:

1. A metal cutting saw blade having a plurality of cutting teeth spaced apart a relatively long distance and provided with cutting edges of a given depth thereby gaging the amount of material to be cut in one operation of the blade, each tooth being inclined inwardly and rearwardly on a substantially straight line from the cutting edge toward the base of the cutting edge of the adjacent tooth, a material receiving pocket adjacent each tooth, and a passageway connecting each material receiving pocket with the cutting edge of its adjacent tooth.

2. A metal cutting hack-saw blade having a plurality of teeth spaced apart a considerable distance and provided with cutting edges, an inverted pyramidal pocket adjacent each tooth, one wall of each pocket being extended to form the cutting edge of its adjacent tooth and the other wall being shorter than the first wall to form the heel of the next tooth, each tooth being inclined rearwardly and inwardly from its cutting edge to its heel on a substantially straight line.

3. A metal cutting hack-saw blade having a plurality of cutting teeth spaced apart a considerable distance and provided with cutting edges, a material pocket adjacent the cutting edge of each tooth, and a projection adjacent each material pocket and spaced from the base of the cutting edge of the adjacent tooth a distance slightly greater than the depth of the cutting edge to provide a passageway connecting each adjacent material pocket and cutting edge, said projections forming the heels of the teeth and each tooth being inclined rearwardly and inwardly from its cutting edge to its heel on a substantially straight line, and the width of each passageway being less than the thickness of the work being cut.

4. A metal cutting hack-saw blade having a plurality of cutting teeth spaced apart a considerable distance and provided with cutting edges, a material pocket adjacent the cutting edge of each tooth, a passageway connecting each adjacent material pocket and cutting edge, and a projection adjacent each material pocket and spaced from the base of the cutting edge of the adjacent tooth a distance slightly greater than the depth of the cutting edge, said projections forming the heels of the teeth and each tooth being inclined rearwardly and inwardly from its cutting edge to its heel on a substantially straight line, the depth of said pockets being less than the length of the teeth, and their inner peripheral walls being downwardly and inwardly inclined in opposite directions to permit the ready dislodgment of the material therefrom when the same passes outwardly of the work being cut.

In testimony whereof I affix my signature.

CHARLES H. DRIVER.